(12) United States Patent
Park (10) Patent No.: US 7,769,341 B2
(45) Date of Patent: Aug. 3, 2010

(54) BROADCASTING SYSTEM AND METHOD FOR PROVIDING BROADCASTING SERVICE IN A WEAK ELECTRIC FIELD AREA

(75) Inventor: Jin Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 730 days.

(21) Appl. No.: 11/524,856

(22) Filed: Sep. 21, 2006

(65) Prior Publication Data

US 2007/0082602 A1 Apr. 12, 2007

(30) Foreign Application Priority Data

Oct. 6, 2005 (KR) ...................... 10-2005-0094053

(51) Int. Cl.
*H04H 1/00* (2006.01)
*H04H 7/00* (2006.01)

(52) U.S. Cl. ...................... 455/3.02; 455/3.06; 370/338

(58) Field of Classification Search ................. 370/338; 455/3.01, 3.02, 3.03, 3.06, 54.2, 115.3
See application file for complete search history.

(56) References Cited

U.S. PATENT DOCUMENTS

| 7,200,402 | B2 * | 4/2007 | Apostolopoulos et al. | 455/442 |
|---|---|---|---|---|
| 7,424,038 | B2 * | 9/2008 | Yang | 370/474 |
| 7,447,486 | B2 * | 11/2008 | Tamura et al. | 455/154.1 |
| 2004/0107447 | A1 * | 6/2004 | Katagishi et al. | 725/135 |
| 2005/0246749 | A1 * | 11/2005 | Tsuruga et al. | 725/100 |
| 2007/0033617 | A1 * | 2/2007 | Bloebaum | 725/58 |

FOREIGN PATENT DOCUMENTS

| JP | 06-224863 | 8/1994 |
|---|---|---|
| JP | 11-068686 | 3/1999 |
| JP | 2000-295188 | 10/2000 |
| JP | 2003-037571 | 2/2003 |
| JP | 2003-134064 | 5/2003 |
| JP | 2004-015224 | 1/2004 |
| JP | 2004-254123 | 9/2004 |
| JP | 2004-274562 | 9/2004 |
| JP | 2004-297628 | 10/2004 |
| JP | 2004-349932 | 12/2004 |
| JP | 2005-253017 | 9/2005 |
| KR | 10-2006-0005250 | 1/2006 |
| KR | 2006032892 A * | 4/2006 |

OTHER PUBLICATIONS

RadioScape LTD, DAB/DMB ETI Replay Unit, Product Data Sheet, 2004, pp. 1-2.*

* cited by examiner

*Primary Examiner*—Vincent P Harper
*Assistant Examiner*—Khalid Shaheed
(74) *Attorney, Agent, or Firm*—The Farrell Law Firm, LLP (57) ABSTRACT

Provided is a broadcasting system and method for providing a broadcasting service in a weak electric field area. The broadcasting system includes a Digital Multimedia Broadcasting (DMB) terminal for if a broadcasting replay request is input during a DMB service, transmitting a replay request message to a streaming server, and upon receipt of broadcasting data responding to the replay request message is received, displaying the received broadcasting data; and the streaming server for if the replay request message is received, providing broadcasting data responding to the replay request message to the DMB terminal.

12 Claims, 5 Drawing Sheets

BROADCASTING SYSTEM AND METHOD FOR PROVIDING BROADCASTING SERVICE IN A WEAK ELECTRIC FIELD AREA

PRIORITY

This application claims priority under 35 U.S.C. §119 to an application entitled "Broadcasting System and Method For Providing Broadcasting Service in Weak Electric Field Area" filed in the Korean Intellectual Property Office on Oct. 6, 2005 and assigned Ser. No. 2005-94053, the contents of which are incorporated herein by reference.

BACKGROUND OF THE INVENTION

1. Field of the Invention

The present invention relates generally to a broadcasting service, and in particular, to a broadcasting system and method for providing a broadcasting service in a weak electric field area.

2. Description of the Related Art

In general, digital broadcasting is a type of broadcasting service for providing high image quality, high sound quality, and a better service to users by replacing conventional analog broadcasting. Recently, in light of the development of digital broadcasting technology and mobile communication technology, users have become increasingly interested in a digital broadcasting service by which the users can watch a digital broadcasting program while in motion.

In the field of broadcasting service, there exists a digital multimedia broadcasting (DMB) service using a mobile communication terminal and a live streaming broadcasting service, which is a real-time multimedia service provided through a third generation (3G) network.

The DMB service is a broadcasting service that allows a user to watch various multi-channel DMB programs even while moving through the use of an omni-directional reception antenna equipped with a personal portable receiver or vehicle receiver. The DMB service is a service having active bi-directionality, personal portability, and mobility. This is achieved by subjugating a service of conventional broadcasting related to passive uni-directionality, a fixed area, and an individual media device, such as a radio or a TV; and providing a video/audio service and convergence of broadcasting and communication (e.g., Digital Audio Broadcasting (DAB)/DMB & 3G, Wideband Code Division Multiple Access (WCDMA) & portable Internet, Wireless Local Area Network (WLAN) & Wireless Internet Platform for Interoperability (WiFi), WiFi & portable Internet, and DAB/DMB & portable Internet) through a single DMB terminal. In addition, the DMB service provides a high quality multimedia service through various mobile terminals, such as cellular phones, laptop computers, Personal Digital Assistants (PDAs), and WiBro phones.

The DMB service is achieved by transmitting DMB data from the ground to a satellite and retransmitting the DMB data from the satellite back to the ground. DMB terminals receive the DMB data retransmitted by the satellite, i.e., directly from the satellite or receive the DMB data via a ground relay station. The ground relay station is a device for emitting DMB data received from a satellite by being installed at places where a satellite signal cannot reach, such as shadow areas due to tall buildings or underground areas.

When a DMB terminal receives DMB data via a ground relay station, the DMB terminal can receive the DMB data even if located in a place where a satellite signal cannot reach regardless of an orientation of a satellite or a signal transmitted directly from the satellite.

That is, in a case of Terrestrial DMB (T-DMB), a DMB terminal can receive DMB data while moving on the ground, but it may not receive the DMB data while located in underground areas. Relay stations (50~70 Km) and gap fillers are required in order to solve a shadow area problem of T-DMB. In a case of Satellite DMB (S-DMB, the shadow area problem must also be solved, and in order to directly receive DMB data on the ground, power adjustment of S-band and installation of gap fillers for covering a radius 500 m are necessary. As such, until a solution has been provided to fully resolve the DMB shadow area problem, fringe areas and weak electric field areas will continue to exist, and therefore, cases where a DMB terminal temporarily cannot receive DMB data while moving will continue to occur, thereby limiting a seamless DMB service.

Thus, a case can occur where a user watching a DMB program using a DMB terminal temporarily cannot watch a portion of the DMB program due to a weak electric field area while moving outdoors. In this case, if the user wants to watch the missing portion of the DMB program, the user can watch a rebroadcasting program, or previously record the DMB program and watch the recorded DMB program at any time. In addition, the user can access a Video on Demand (VOD) server through the Internet or a mobile communication network, search for content corresponding to the DMB program, and watch the DMB program by downloading or streaming the found content. However, even if the user wants to watch the DMB program using the VOD server, the user can watch the DMB program only after the real-time DMB program is terminated.

As described above, a case where a user cannot watch a DMB program in a weak electric field area during a DMB service frequently occurs. According to the conventional art, there is no method of immediately watching the missing DMB program.

SUMMARY OF THE INVENTION

An object of the present invention is to substantially solve at least the above described problems and/or disadvantages as well as to provide at least the advantages described herein. Accordingly, an aspect of the present invention is to provide a broadcasting system and method for providing a broadcasting service in a weak electric field area.

Another aspect of the present invention is to provide a broadcasting system and method for allowing a user to continuously watch a Digital Multimedia Broadcasting (DMB) program using a DMB terminal even when located in a weak electric field area during a DMB service.

According to an aspect of the present invention, there is provided a broadcasting system for providing a broadcasting service in a weak electric field area, the broadcasting system including a Digital Multimedia Broadcasting (DMB) terminal for, if a broadcasting replay request is input during a DMB service, transmitting a replay request message to a streaming server, and if broadcasting data responding to the replay request message is received, displaying the received broadcasting data; and the streaming server for, if the replay request message is received, providing broadcasting data responding to the replay request message to the DMB terminal.

According to another aspect of the present invention, there is provided a broadcasting system for providing a broadcasting service in a weak electric field area, the broadcasting system including a Digital Multimedia Broadcasting (DMB)

terminal for, if a broadcasting replay request to watch a broadcasting program from a broadcasting portion corresponding to an entering time to the weak electric field area is input during a DMB service, transmitting a broadcasting request message, that contains therein the time entering the weak electric field area and broadcasting channel information, to a streaming server, and if broadcasting data is received from the streaming server, displaying the received broadcasting data; and the streaming server for, if the broadcasting request message is received, providing broadcasting data beginning from the broadcasting portion corresponding to the time entering the weak electric field area to the DMB terminal.

According to still another aspect of the present invention, there is provided a broadcasting system for providing a broadcasting service in a weak electric field area, the broadcasting system includes a Digital Multimedia Broadcasting (DMB) terminal for, if the weak electric field area is detected during a DMB service, transmitting a broadcasting request message, that contains a time entering the weak electric field area as well as broadcasting channel information, to a streaming server, and if broadcasting data is received from the streaming server, displaying the received broadcasting data; and the streaming server for, if the broadcasting request message is received, providing broadcasting data beginning from a broadcasting portion corresponding to the time entering the weak electric field area to the DMB terminal.

According to yet another aspect of the present invention, there is provided a method of providing a broadcasting service in a weak electric field area, the method including transmitting, by a DMB terminal, a replay request message to a streaming server, if a broadcasting replay request is input during a Digital Multimedia Broadcasting (DMB) service; providing, by the streaming server, broadcasting data responding to the replay request message to the DMB terminal, upon receipt of the replay request message; and, displaying, by the DMB terminal, the received broadcasting data, upon receipt of the broadcasting data responding to the replay request message.

According to yet still another aspect of the present invention, there is provided a method of providing a broadcasting service in a weak electric field area, the method including if a broadcasting replay request for watching a broadcasting program from a broadcasting portion corresponding to a time entering the weak electric field area is input during a Digital Multimedia Broadcasting (DMB) service, transmitting, by a DMB terminal, a broadcasting request message, that contains the time entering the weak electric field area and broadcasting channel information, to a streaming server; upon receipt of the broadcasting request message, providing, by the streaming server, broadcasting data beginning from the broadcasting portion corresponding to the time entering the weak electric field area to the DMB terminal; and upon receipt of the broadcasting data from the streaming server, displaying, by the DMB terminal, the received broadcasting data.

According to another aspect of the present invention, there is provided a method of providing a broadcasting service in a weak electric field area, the method including if the weak electric field area is detected during a Digital Multimedia Broadcasting (DMB) service, transmitting, via a DMB terminal, a broadcasting request message, that contains a time entering the weak electric field area and broadcasting channel information, to a streaming server; upon receipt of the broadcasting request message, providing, by the streaming server, broadcasting data beginning from a broadcasting portion corresponding to the time entering the weak electric field area to the DMB terminal; and upon receipt of the broadcasting data from the streaming server, displaying, by the DMB terminal, the received broadcasting data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described herein with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

According to the present invention, a Digital Multimedia Broadcasting (DMB) terminal can receive a broadcasting service through a streaming server while in a weak electric field area in order to continuously watch an ongoing DMB program or immediately watch a missed DMB program again. In addition, after moving outside of the weak electric field area, the DMB terminal can receive a DMB service through a DMB system.

Figure 1:
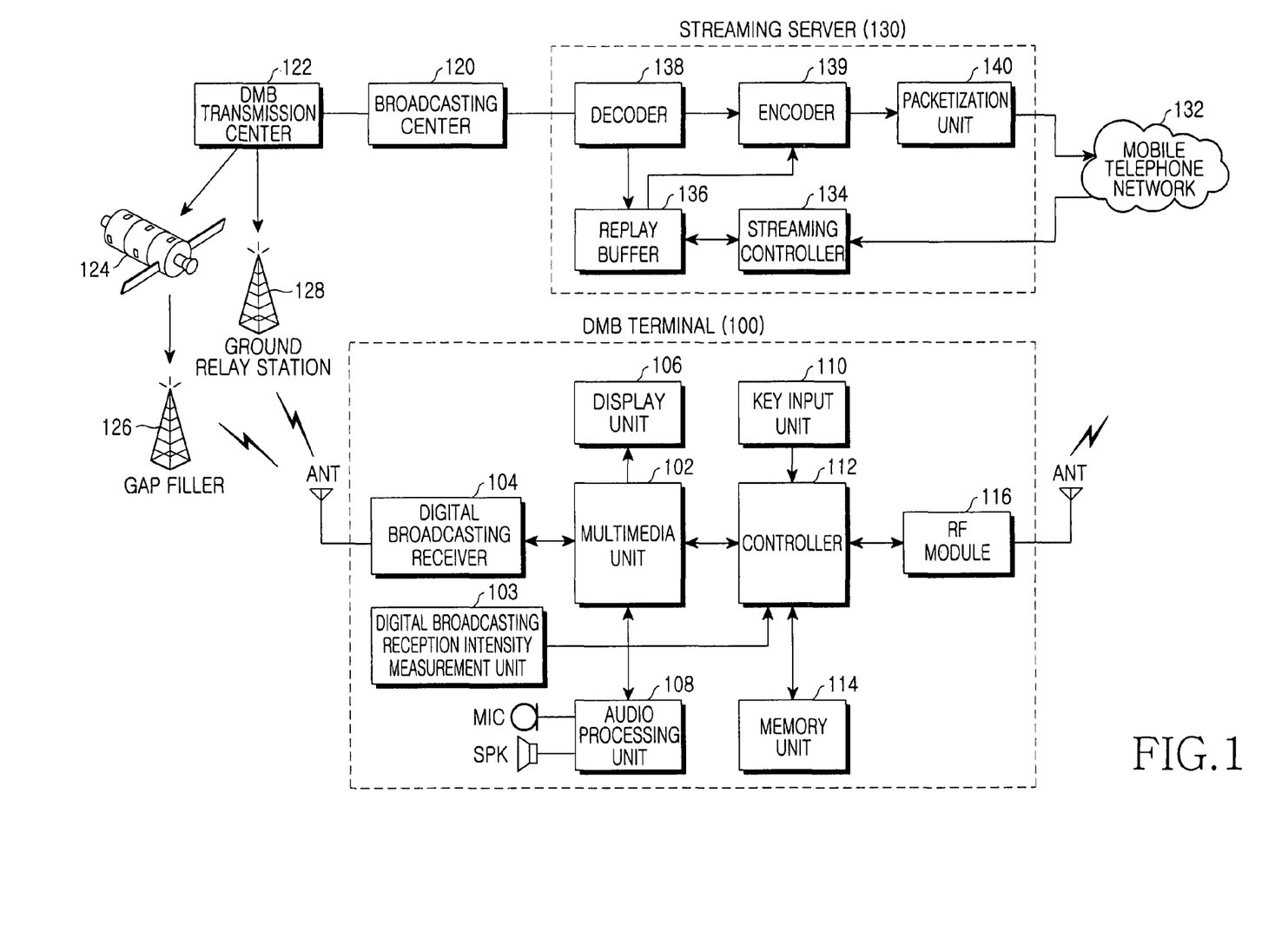
FIG. 1 is a block diagram illustrating a broadcasting system for providing a broadcasting service in a weak electric field area according to the present invention.

FIG. 1 is a block diagram illustrating a broadcasting system for providing a broadcasting service in a weak electric field area according to the present invention.

Referring to FIG. 1, a broadcasting center 120 transmits broadcasting data to a DMB transmission center 122 and a streaming server 130. The DMB transmission center 122 transmits DMB data to a DMB terminal 100 via a satellite 124 and a gap filler 126. The DMB transmission center 122 also transmits the DMB data to the DMB terminal 100 via a ground relay station 128.

The streaming server 130, which receives the broadcasting data from the broadcasting center 120, transmits the broadcasting data to the DMB terminal 100 in real-time upon receipt of a broadcasting service request from the DMB terminal 100.

The streaming server 130 includes a decoder 138 for decoding the broadcasting data received from the broadcasting center 120, a replay buffer 136 for storing the decoded broadcasting data for a predetermined time, an encoder 139 for encoding the decoded broadcasting data, a packetization unit 140 for packetizing the encoded broadcasting data, and a streaming controller 134 for controlling the above-described components of the streaming server 130 to transmit real-time broadcasting data or encode, packetize, and transmit broadcasting data, which is stored in the replay buffer 136, corresponding to a requested portion in response to a broadcasting replay request. In particular, in the present invention, the streaming server 130 includes the replay buffer 136 for also storing broadcasting data transmitted in real-time from the broadcasting center 120 for a predetermined time. The replay buffer 136 is a circular type buffer, a capacity of the replay buffer 136 depends on a memory resource, and stream data greater than the capacity of the replay buffer 136 is stored in the replay buffer 136 using a rewriting method.

A configuration of the DMB terminal 100, which receives a broadcasting service from the streaming server 130 in a weak electric field area, will be described herein below.

A digital broadcasting receiver 104 receives a DMB signal through an antenna, demultiplexes a transmitted packet from the DMB signal, decodes the demultiplexed packet, and parses video and audio data from the decoded packet.

A multimedia unit 102 performs a control function in a digital broadcasting service and performs a function of outputting the video and audio data received from the digital broadcasting receiver 104 to a display unit 106 and an audio processing unit 108, respectively.

A digital broadcasting reception intensity measurement unit 103 measures the intensity or Bit Error Rate (BER) of the DMB signal output from the digital broadcasting receiver 104.

A controller 112 performs a general control operation of the DMB terminal 100. In particular, in the present invention, the controller 112 controls an operation for receiving broadcasting data through the streaming server 130 according to a broadcasting replay mode request during a DMB service. In addition, if the signal intensity or BER measured by the digital broadcasting reception intensity measurement unit 103 is less than a predetermined threshold, the controller 112 determines that the DMB terminal 100 is located in a weak electric field area and controls an operation for receiving an ongoing broadcasting service through the streaming server 130 in the weak electric field area. These control processes will be described in detail herein with reference to FIGS. 2 to 4. When the DMB terminal 100 requests the streaming server 130 for a broadcasting service, the DMB terminal 100 uses a Real-Time Streaming Protocol (RTSP) message.

The display unit 106 receives and displays displayed data corresponding to key input data input from a key input unit 110 under a control of the controller 112 or displays a state of a function set or operated by a user. In the present invention, the display unit 106 displays video according to the broadcasting service, i.e., displays broadcasting data received from the streaming server 130 on a sub-screen thereof under a control of the controller 112. In addition, the display unit 106 displays DMB data on a main screen thereof under a control of the controller 112.

The audio processing unit 108 is connected to a microphone MIC and a speaker SPK, it converts the audio data received from the multimedia unit 102 to an audio signal and outputs the converted audio signal to the speaker SPK, and converts an audio signal received from the microphone MIC to audio data and outputs the converted audio data to the multimedia unit 102.

The key input unit 110 is a device for interfacing with the user and outputs unique key input data corresponding to selection of each key included therein. The key input data output from the key input unit 110 is input to the controller 112, and which key is selected is detected from the key input data, and the controller 112 performs an operation corresponding to the detection result. The key input unit 110 includes a replay mode key for requesting the streaming server 130 for a broadcasting replay and a key for requesting a broadcasting service from an entering time to a weak electric field area in a DMB weak electric field mode. The two keys can be realized using function keys for performing other existing functions or additional keys.

A memory unit 114 stores information related to general functions of the DMB terminal 100 and information related to providing of a broadcasting service. In particular, according to the present invention, the memory unit 114 stores a granule time for receiving a broadcasting service through the streaming server 130 when the replay mode key is selected. The granule time is a time unit of how previous broadcasting data from current broadcasting data should be searched every time the replay mode key is selected.

A radio frequency (RF) module 116 both transmits as well as receives an RF signal with a mobile telephone network 132 via an antenna under a control of the controller 112.

A process of providing a broadcasting service in the broadcasting system of FIG. 1 in a DMB weak electric field area will now be described with reference to FIGS. 2 to 5.

Figure 2:
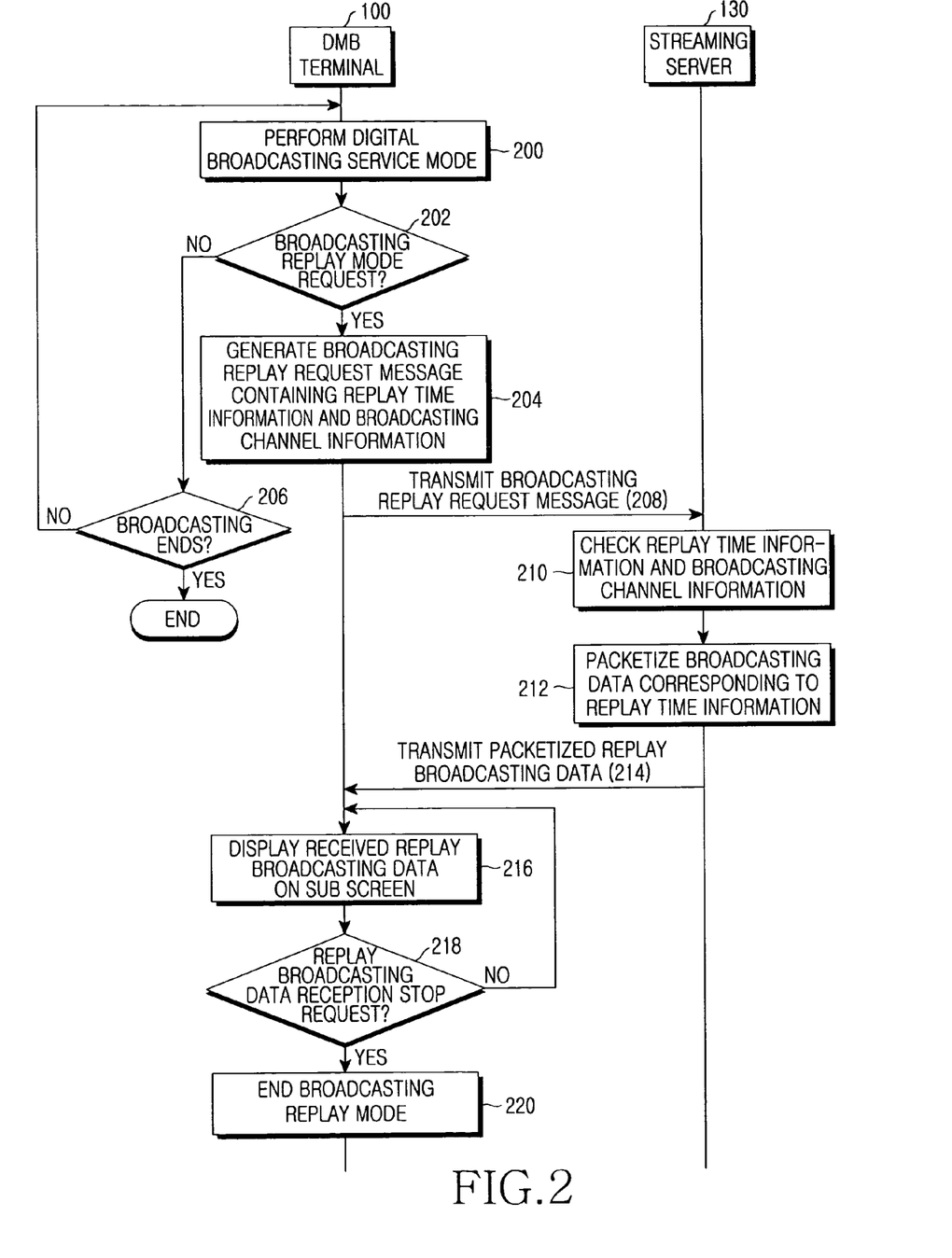
FIG. 2 is a flow chart illustrating a method of providing a broadcasting service between a Digital Multimedia Broadcasting (DMB) terminal and a streaming server according to the present invention.

FIG. 2 is a flow chart illustrating a method of providing a broadcasting service between the DMB terminal 100 and the streaming server 130 according to the present invention. Referring to FIG. 2, when the user of the DMB terminal 100 cannot watch a DMB program due to carelessness or requests a broadcasting replay while moving through a weak electric field area or after moving outside of the weak electric field area, a broadcasting service can be provided through the streaming server 130.

While performing a digital broadcasting service mode in step 200, the DMB terminal 100 determines in step 202 using a thread performing the digital broadcasting service whether a broadcasting replay mode request is input. If the broadcasting replay mode request is input as the determination result, this process goes to step 204. Otherwise, if the broadcasting replay mode request is not input, the process goes to step 206, and until broadcasting is terminated, the process goes back to step 200 and continuously provides a digital broadcasting service. That is, steps 200, 202, 204, and 206 are the thread performing the digital broadcasting service mode in the DMB terminal 100.

If the broadcasting replay mode request is input in step 202, the DMB terminal 100 generates a broadcasting replay request message containing replay time information and broadcasting channel information in step 204 and transmits the generated broadcasting replay request message to the streaming server 130 in step 208. Herein, the replay time information is past time information for the broadcasting replay. The DMB terminal 100 performs the thread performing the digital broadcasting service mode and a thread performing a replay broadcasting service, i.e., steps 216 to 220, at the same time.

The streaming server 130 checks the replay time information and broadcasting channel information contained in the broadcasting replay request message in step 210, reads broadcasting data corresponding to the replay time information from the replay buffer 136 in which broadcasting data corresponding to the broadcasting channel information is stored and packetizes the read broadcasting data using the packetization unit 140 in step 212, and transmits the packetized broadcasting data to the DMB terminal 100 in step 214. If the replay time information is out of a time range, which can be stored in the streaming server 130, the streaming server 130 sets the replay time information as the oldest time which can be replayed by the replay buffer 136.

The replay thread of the DMB terminal 100 displays the received broadcasting data for replay on the sub-screen in step 216. When the user selects the replay mode key, a DMB program is displayed on the main screen, and the replay broadcasting data is displayed on the sub-screen. When the DMB program and the replay broadcasting data are simultaneously displayed, the user can exchange a main screen size and a sub-screen size for convenience of use or display only the replay broadcasting data on the main screen without the sub-screen in a DMB weak electric field area.

Figure 5:
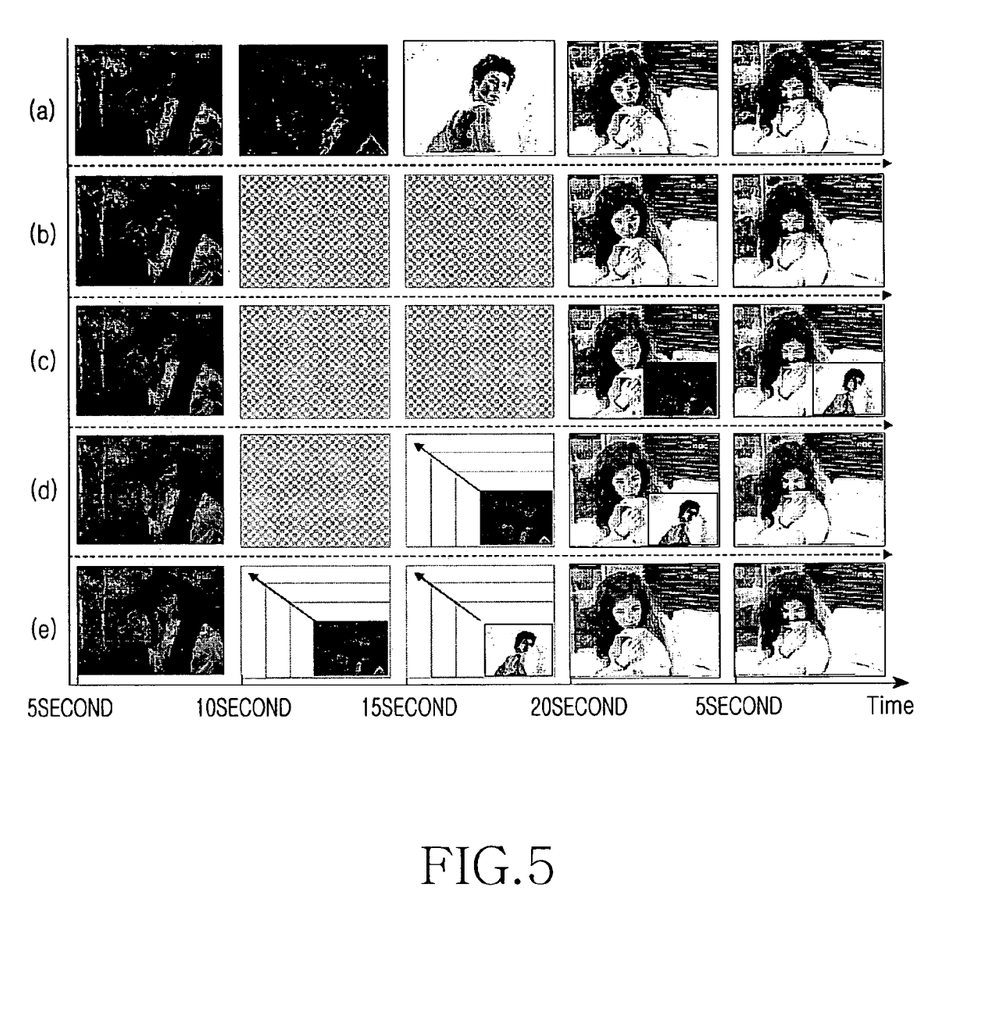
FIG. 5 illustrates images displayed on the DMB terminal in the broadcasting service of FIG. 2, 3, or 4 according to the present invention.

For example, referring to FIG. 5, when the user of the DMB terminal 100 moves to a weak electric field area while a DMB program of FIG. 5A is being provided, if the user requests a broadcasting replay mode at a point of 15 seconds after moving to the weak electric field area as illustrated in FIG. 5D, the user can watch a missing portion received through the streaming server 130 on the sub-screen. That is, the user can request the broadcasting replay mode at the point of 15 seconds regardless of a reception state in the weak electric field area. After around 5 seconds from when the DMB program is normally received, i.e. from a point of 20 seconds, the live streaming from the streaming server 130 can stop, and 5 seconds indicate a time difference between when the weak electric field area begins and when the broadcasting replay mode begins. Herein, it is assumed that the granule time for the broadcasting replay mode is 10 seconds.

In step 218, it is determined whether the user selects to stop receiving the replay broadcasting data. If it is determined that the user selects to stop receiving the replay broadcasting data, the broadcasting replay mode terminates in step 220. If it is determined that the user does not select to stop receiving the replay broadcasting data, the process goes back to step 216, and the received replay broadcasting data is continuously displayed on the sub-screen using the replay thread. In the weak electric field area, the DMB program can be hidden in the back-end, and the broadcasting data according to the broadcasting replay mode can be displayed on the entire screen.

As illustrated in FIG. 2, the user of the DMB terminal 100 can receive a DMB program, which the user could not watch due to carelessness or could not receive due to movement to a weak electric field area, through the streaming server 130. Thus, since the user can watch a portion of real-time broadcasting program, which the user could not watch, again through the broadcasting replay mode at any desired time, a delay time for the replay can be reduced.

Figure 3:
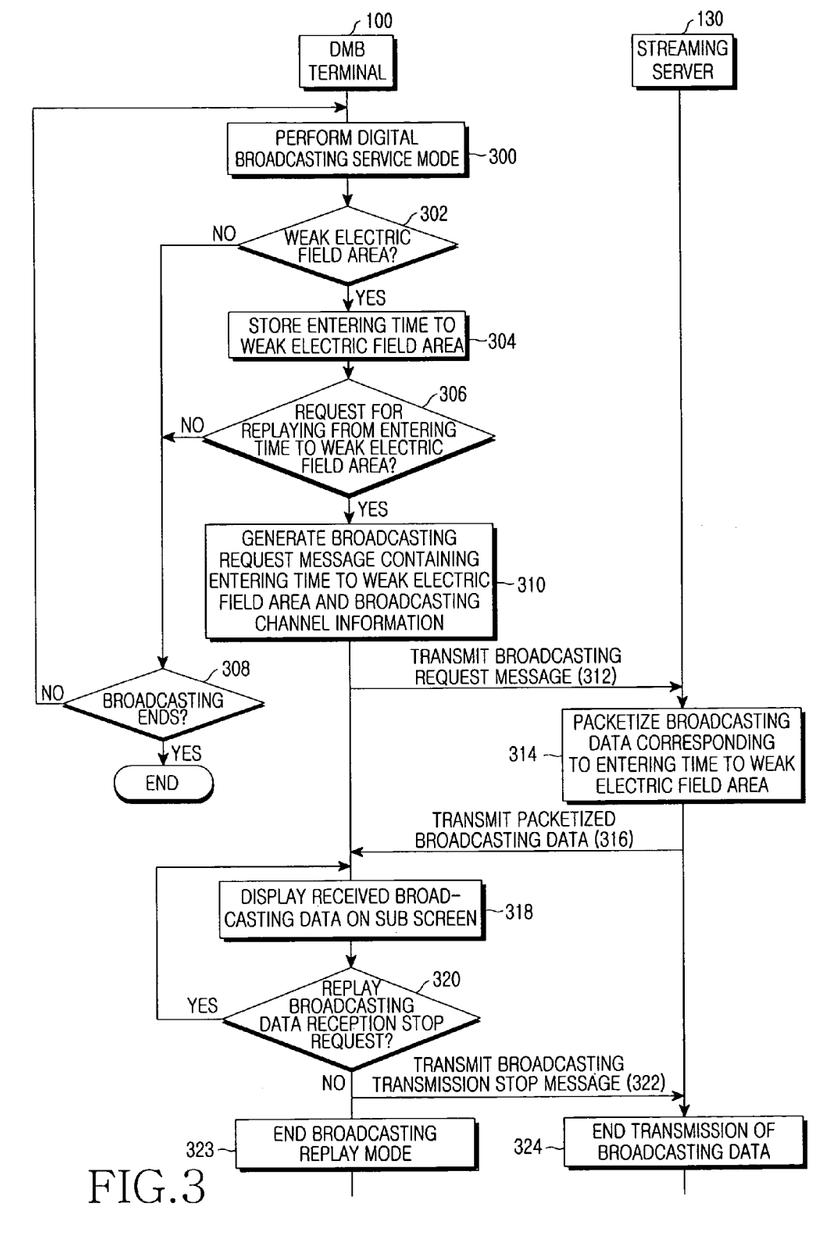
FIG. 3 is a flow chart illustrating a method of providing a broadcasting service between a Digital Multimedia Broadcasting (DMB) terminal and a streaming server in a weak electric field area according to the present invention.

A process of receiving a broadcasting service from when the DMB terminal 100 begins to enter into a weak electric field area to when the DMB terminal 100 goes out of the weak electric field area from the streaming server 130 while or after passing through the weak electric field area will now be described with reference to FIG. 3. FIG. 3 is a flow chart illustrating a method of providing a broadcasting service between the DMB terminal 100 and the streaming server 130 in a weak electric field area according to the present invention.

In step 300, while performing a digital broadcasting service mode, the DMB terminal 100 determines in step 302 using the thread performing the digital broadcasting service mode whether the DMB terminal 100 is in a weak electric field area. Herein, the intensity or BER of a DMB signal is measured, and if the measured intensity or BER is less than a predetermined threshold, it is determined that the DMB terminal 100 is in a weak electric field area. If it is determined that the DMB terminal 100 is in a weak electric field area, in step 304 the DMB terminal 100 stores a time entering the weak electric field area. In step 306, the DMB terminal 100 determines whether a broadcasting replay request of a portion from the entering time to the weak electric field area is input.

Upon determining in step 306 that the broadcasting replay request is input, the DMB terminal 100 generates a broadcasting replay request message containing the time entering the weak electric field area and ongoing broadcasting channel information in step 310. In step 312, the DMB terminal 100 transmits the generated broadcasting replay request message to the streaming server 130. Herein, steps 300, 302, 304, 306, 308, and 310 are the thread performing the digital broadcasting service mode.

As described above, when a key for replaying broadcasting data from a broadcasting portion which the user could not watch due to entering in to a weak electric field area is selected, the DMB terminal 100 performs an operation for replaying the broadcasting data from the broadcasting portion corresponding to the latest entering time to a weak electric field area. If several cases of entering in to a weak electric field area exist, the entering times to a weak electric field area are sequentially stored, and when the key for replaying broadcasting data from a broadcasting portion corresponding to an entering time to a weak electric field area is selected as a long key, a search operation is performed in an order from the latest entering time to a weak electric field area to a previous entering time to a weak electric field area. When the long key drops, the DMB terminal 100 performs an operation for replaying broadcasting data corresponding to an entering time matching the drop time of the long key. That is, an entering time selected by the long key is contained in the broadcasting replay request message as a starting time for replay.

The streaming server 130, which has received the broadcasting replay request message from the DMB terminal 100, reads broadcasting data corresponding to the time entering the weak electric field area from the replay buffer 136 and packetizes the read broadcasting data in step 314 and transmits the packetized broadcasting data to the DMB terminal 100 in real-time in step 316. The DMB terminal 100 performs the thread performing the digital broadcasting service mode and the thread performing a replay broadcasting service, i.e., steps 318 to 323, at the same time.

The DMB terminal 100, which has received the packetized broadcasting data from the streaming server 130, displays the received broadcasting data on the sub-screen using the replay thread in step 318. This display continues until the user selects a replay stop key in step 320, and when a DMB program and the replay broadcasting data are simultaneously displayed on the main screen and the sub-screen, the user can exchange a main screen size and a sub-screen size for convenience of use or display only the replay broadcasting data on the main screen without the sub-screen in a DMB weak electric field area.

If the user selects the replay stop key in step 320, the DMB terminal 100 transmits a broadcasting transmission stop message to the streaming server 130 in step 322 and terminates the broadcasting replay mode in step 323. That is, according to the present invention, the DMB terminal 100 can receive a seamless broadcasting service by memorizing the time when DMB data cannot be normally received due to entering into a weak electric field area and requesting the streaming server 130 for replay broadcasting data from a broadcasting portion corresponding to the entering time to a weak electric field area.

The streaming server 130, which has received the broadcasting transmission stop message, stops the transmission of broadcasting data to the DMB terminal 100 in step 324.

Figure 4:
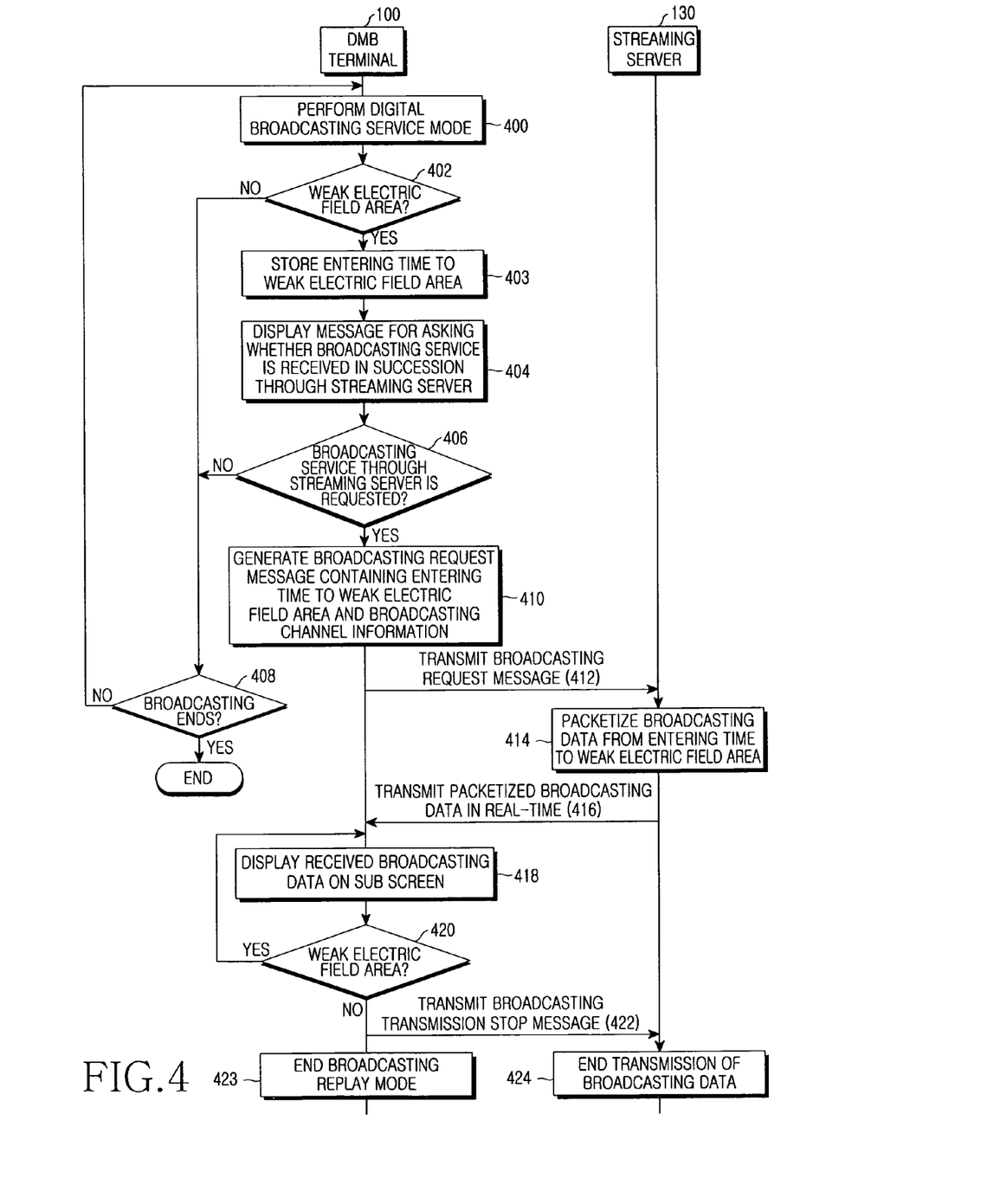
FIG. 4 is a flow chart illustrating a method of providing a broadcasting service between a DMB terminal and a streaming server in a weak electric field area according to the present invention.

A process of automatically receiving a broadcasting service from the streaming server 130 when the user enters into a weak electric field area and receiving a broadcasting service from a DMB system when the user goes out of the weak electric field area will be described with reference to FIG. 4. FIG. 4 is a flow chart illustrating a method of providing a broadcasting service between the DMB terminal 100 and the streaming server 130 in a weak electric field area according to the present invention.

In the step 400, the DMB terminal 100 is performing a digital broadcasting service mode. A digital broadcasting service mode thread of the DMB terminal 100 determines in step 402 whether the DMB terminal 100 is in a weak electric field area.

Upon determining that the DMB terminal 100 is in a weak electric field area, the DMB terminal 100 stores an entering time to the weak electric field area in step 403. In step 404, the DMB terminal 100 displays a message for asking whether a broadcasting service is received through the streaming server 130.

If a request of a broadcasting service through the streaming server 130 is input in step 406, the process goes to step 410. That is, as soon as the DMB terminal 100 enters into a weak electric field area, the DMB terminal 100 can receive a broadcasting service through the streaming server 130 in succession.

Although an operation for asking the user for whether the broadcasting service is received through the streaming server 130 in succession is performed in the present invention, the broadcasting service can be automatically received through the streaming server 130 in succession in a weak electric field area according to a setting. That is, the DMB terminal 100 determines whether the user has agreed to receive the broadcasting service through the streaming server 130 in succession from the entering time to the weak electric field area. If a setting for automatically receiving a broadcasting service through the streaming server 130 in succession in a weak electric field area exists, steps 404 and 406 are omitted, and the process directly goes from step 402 to step 410.

The DMB terminal 100 generates a broadcasting request message containing the time entering to the weak into electric field area and broadcasting channel information in step 410 and transmits the generated broadcasting request message to the streaming server 130 in step 412. Herein, steps 400, 402, 403, 404, 406, 408, and 410 are the thread performing the digital broadcasting service mode in the DMB terminal 100.

The streaming server 130, which has received the broadcasting request message from the DMB terminal 100, reads broadcasting data corresponding to the time entering to the weak electric field area from the replay buffer 136 and packetizes the read broadcasting data in step 414 and transmits the packetized broadcasting data to the DMB terminal 100 in real-time in step 416. The DMB terminal 100 performs the thread performing the digital broadcasting service mode and the thread performing the replay broadcasting service, i.e., steps 418 to 423, at the same time.

The DMB terminal 100, having received the packetized broadcasting data from the streaming server 130, displays the received broadcasting data on the sub-screen in step 418. When a DMB program and the received broadcasting data are simultaneously displayed on the main screen and the sub-screen, the user can exchange a main screen size and a sub-screen size for convenience of use or display only the received broadcasting data on the main screen without the sub-screen in a DMB weak electric field area. The DMB terminal 100 determines in step 420 whether the DMB terminal 100 is still in the weak electric field area. If it is determined that the DMB terminal 100 is still in the weak electric field area, the process goes back to step 418, and the DMB terminal 100 continuously displays the received broadcasting data on the sub-screen. For example, as illustrated in FIG. 5E, a seamless broadcasting service can be received by receiving the broadcasting service through the streaming server 130 as soon as the DMB terminal 100 enters into a weak electric field area.

If it is determined in step 420 that the DMB terminal 100 is not in the weak electric field area, the DMB terminal 100 transmits a broadcasting transmission stop message to the streaming server 130 in step 422 and terminates the broadcasting replay mode in step 423. The streaming server 130, which has received the broadcasting transmission stop message, stops the transmission of broadcasting data to the DMB terminal 100 in step 424. That is, when the DMB terminal 100 goes out of the weak electric field area, the broadcasting service through the streaming server 130 automatically ends, and DMB data can be normally received from a DMB system.

As illustrated in FIG. 4, a seamless broadcasting service can be provided through an automatic broadcasting service handover through which the DMB terminal 100 can receive a broadcasting service through the streaming server 130 as soon as the DMB terminal 100 enters into a weak electric field area.

As described above, according to the present invention, replay broadcasting data can be provided through a streaming server according to a broadcasting replay request of a DMB service. In addition, a seamless broadcasting service can be provided by automatically performing service handover according to a user's request for receiving through the streaming server in succession in a weak electric field area.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A broadcasting system for providing a broadcasting service in a weak electric field area, the broadcasting system comprising:
   a Digital Multimedia Broadcasting (DMB) terminal for, if a broadcasting replay request is input during a DMB service, transmitting a replay request message to a streaming server, and if broadcasting data responding to the replay request message is received, displaying the received broadcasting data; and
   the streaming server for if the replay request message is received, providing the broadcasting data responding to the replay request message to the DMB terminal,
   wherein the DMB terminal includes a main screen for displaying the DMB service and a sub-screen for displaying the received broadcasting data for replay, and
   wherein the DMB terminal continuously displays the received broadcasting data on the sub-screen and the DMB service on the main screen, when the DMB terminal exits the weak electric field area until the DMB terminal selects to stop receiving the received broadcasting data.

2. The broadcasting system of claim 1, wherein the replay request message comprises a granule time information of how previous broadcasting data from current broadcasting data should be searched by referring to the broadcasting replay request time.

3. The broadcasting system of claim 2, wherein if upon receipt of the replay request message, the streaming server searches broadcasting data before the granule time from the broadcasting replay request time and transmits the broadcasting data to the DMB terminal in an order from broadcasting data corresponding to time before the granule time to broadcasting data corresponding to the broadcasting replay request time.

4. A broadcasting system for providing a broadcasting service in a weak electric field area, the broadcasting system comprising:

a Digital Multimedia Broadcasting (DMB) terminal for if a broadcasting replay request for watching a broadcasting program from a broadcasting portion corresponding to a time entering into the weak electric field area is input during a DMB service, transmitting a broadcasting request message, which contains the time entering into the weak electric field area and broadcasting channel information, to a streaming server, and if broadcasting data is received from the streaming server, displaying the received broadcasting data; and the streaming server for, if the broadcasting request message is received, providing broadcasting data beginning from the broadcasting portion corresponding to the time entering into the weak electric field area to the DMB terminal, wherein the DMB terminal includes a main screen for displaying the DMB service and a sub-screen for displaying the received broadcasting data for replay, and wherein the DMB terminal continuously displays the received broadcasting data on the sub-screen and the DMB service on the main screen, when the DMB terminal exits the weak electric field area until the DMB terminal selects to stop receiving the received broadcasting data.

5. The broadcasting system of claim 4, wherein the DMB terminal selects to stop receiving the received broadcasting data by transmitting a broadcasting transmission stop message to the streaming server in response to a user's request.

6. The broadcasting system of claim 5, wherein if the broadcasting transmission stop message is received, the streaming server stops the transmission of the broadcasting data to the DMB terminal.

7. A method of providing a broadcasting service in a weak electric field area, the method comprising the steps of:

if a broadcasting replay request is input during a Digital Multimedia Broadcasting (DMB) service, transmitting, by a DMB terminal, a replay request message to a streaming server;

upon receipt of the replay request message, providing, by the streaming server, broadcasting data responding to the replay request message to the DMB terminal; and if the broadcasting data responding to the replay request message is received, displaying, by the DMB terminal, the received broadcasting data, wherein the DMB terminal includes a main screen for displaying the DMB service and a sub-screen for displaying the received broadcasting data for replay, and wherein the DMB terminal continuously displays the received broadcasting data on the sub-screen and the DMB service on the main screen, when the DMB terminal exits the weak electric field area until the DMB terminal selects to stop receiving the received broadcasting data.

8. The method of claim 7, wherein the replay request message comprises a granule time information of how previous broadcasting data from current broadcasting data should be searched by referring to the broadcasting replay request time.

9. The method of claim 8, wherein the step of providing, by the streaming server, broadcasting data responding to the replay request message comprises if the replay request message is received, searching broadcasting data before the granule time from the broadcasting replay request time and transmitting the broadcasting data to the DMB terminal in an order from broadcasting data corresponding to time before the granule time to broadcasting data corresponding to the broadcasting replay request time.

10. A method of providing a broadcasting service in a weak electric field area, the method comprising the steps of:

if a broadcasting replay request for watching a broadcasting program from a broadcasting portion corresponding to a time entering into the weak electric field area is input during a Digital Multimedia Broadcasting (DMB) service, transmitting, by entering into the weak electric field area and broadcasting channel information, to a streaming server;

if the broadcasting request message is received, providing, by the streaming server, broadcasting data beginning from the broadcasting portion corresponding to the time entering into the weak electric field area to the DMB terminal; and upon receipt of the broadcasting data from the streaming server, displaying, by the DMB terminal, the received broadcasting data, wherein the DMB terminal includes a main screen for displaying the DMB service and a sub-screen for displaying the received broadcasting data for replay, and wherein the DMB terminal continuously displays the received broadcasting data on the sub-screen and the DMB service on the main screen, when the DMB terminal exits the weak electric field area until the DMB terminal selects to stop receiving the received broadcasting data.

11. The method of claim 10, further comprising transmitting, by the DMB terminal, a broadcasting transmission stop message to the streaming server in response to a user's request.

12. The method of claim 11, further comprising upon receipt of the broadcasting transmission stop message, stopping, by the streaming server, the transmission of the broadcasting data to the DMB terminal.

* * * * *